S. JOHNSON.
Horse Rake.
No. 66,352.
2 Sheets—Sheet 1.
Patented July 2, 1867.
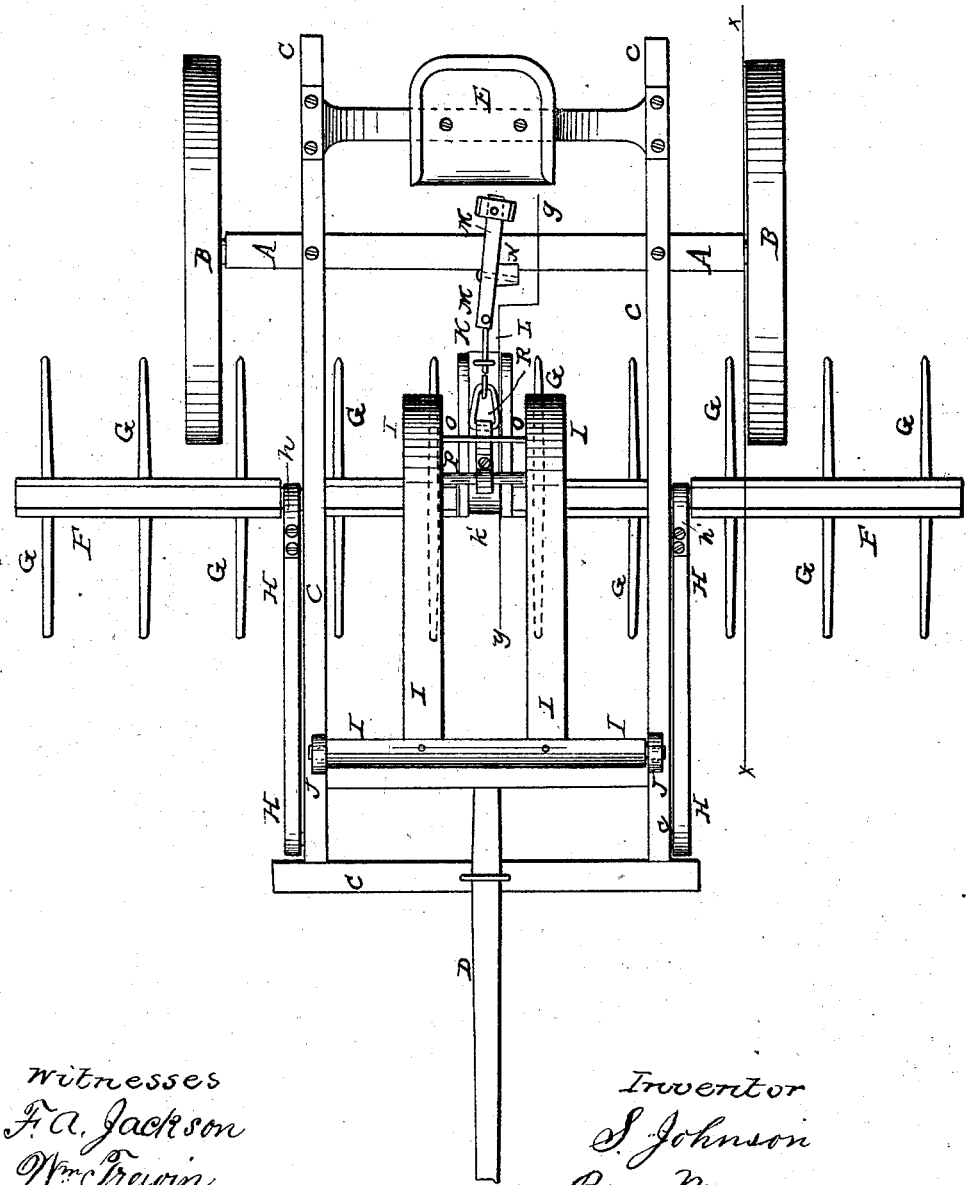
Witnesses
F. A. Jackson
Wm Trevin
Inventor
S. Johnson
Per Munn & Co
Attorneys

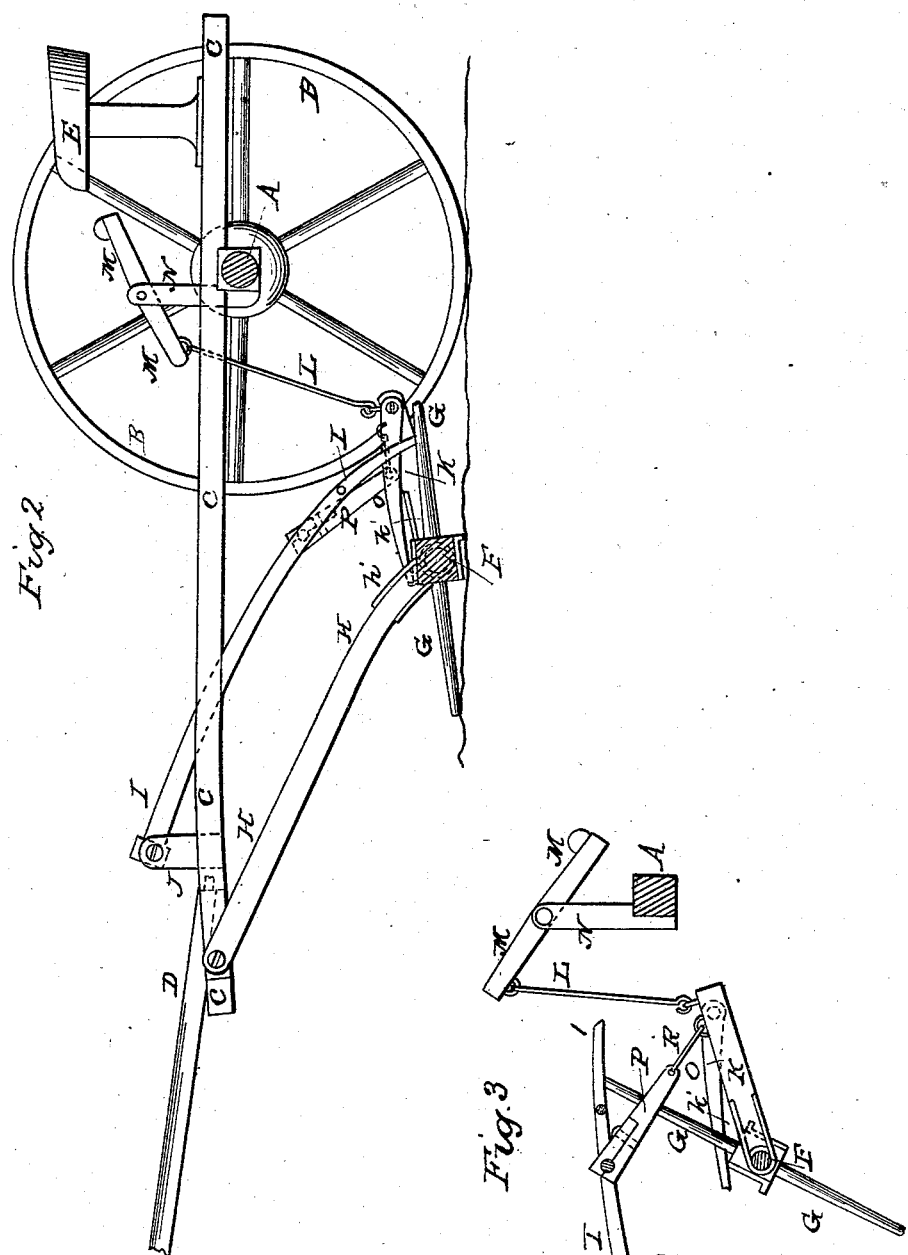

UNITED STATES PATENT OFFICE.

SYLVESTER JOHNSON, OF NEW HARMONY, INDIANA.

IMPROVEMENT IN HAY-RAKES.

Specification forming part of Letters Patent No. 66,352, dated July 2, 1867.

*To all whom it may concern:*

Be it known that I, SYLVESTER JOHNSON, of New Harmony, in the county of Posey and State of Indiana, have invented a new and Improved Hay-Rake; and I do hereby declare that the following is a full, clear, and exact description thereof, which will enable others skilled in the art to make and use the same, reference being had to the accompanying drawings, forming part of this specification, in which—

Figure 1 is a top view of my improved hay-rake. Fig. 2 is a side view of the same, partly in section, through the line $x\ x$, Fig. 1. Fig. 3 is a detail sectional view of the same, taken through the line $y\ y$, Fig. 1, showing the position of the parts when the rake-head is revolving.

Similar letters of reference indicate like parts.

My invention consists in the frame from which the rake is pivoted, made with curved side timbers in the sash for holding the rake-head in proper position while raking; in the combination of a lever, chain or rod, arm, and pawls with each other and with the rake-head; in forming notches in the rake-teeth, so that the sash may have an inclined position; and in the combination of an arm and link, or equivalent, with the sash and arm of the rake-head.

A is the axle, which should be six feet long, and to which the wheels B are attached in the ordinary manner. C is a frame, which should be about eight and a half feet long and three and a half feet wide. The side timbers of the frame C are made curved, as shown in Fig. 2, and they are securely attached near their rear ends to the axle A. D is the tongue, which is attached to the forward end of the frame C, and E is the driver's seat, which is attached to the rear part of said frame, as shown. F is the shaft of the rake-head, to which the teeth G are attached in the ordinary manner. The teeth G should be placed ten inches apart. H are the knees, to the lower ends of which the shaft F is connected by straps $h'$, in the ordinary manner, and the upper ends of which are pivoted to the forward ends of the curved side timbers of the frame C, as shown in Figs. 1 and 2. I is the sash or frame that holds the rake-head in proper position while collecting the hay. The forward end of the sash or frame I is pivoted to short arms J, attached to the forward part of the frame C, and its side bars have the same curve as the knees H. This allows the rake-head to move up and down in passing over uneven surfaces without being thrown out of gear or out of its proper raking position. The lower ends of the side bars of the sash I rest in notches formed in the teeth G near their ends, so that the said sash may hold the rake-head steady, and at the same time be in an inclined position. K is an arm, one end of which is connected to the shaft F by a band, $k'$, passing around the said shaft, in the same manner as the knees H are connected to it. To the outer end of the arm K is pivoted the lower end of a rod or chain, L, the upper end of which is pivoted to the forward end of the lever M. The lever M is pivoted to the arm N, attached to the axle A, and extends back into such a position that it can be reached and operated by the driver with his foot.

To the sides of the arm K, at its rear end, are pivoted two pawls, O, the forward ends of which take hold of teeth or shoulders formed upon the shaft F of the rake-head to revolve it. P is an arm, the upper end of which is pivoted to the sash I, and the lower end is connected to the rear end of the arm K by the link R, or its equivalent, in such a way that the lower end may rest upon the upper side of the arm K, so as to raise the sash I and free the rake-head whenever the said arm K is raised by operating the lever M.

The arm P may be made adjustable by making it in two parts, or in any other convenient manner, so that its length may be regulated as circumstances may require.

What I claim as new, and desire to secure by Letters Patent, is—

1. The combination of the lever M, chain or rod L, arm K, pivoted sash or frame I, and pawls O with the shaft of the rake-head, substantially as herein shown and described, and for the purpose set forth.

2. The combination of the arm P and link R, or its equivalent, with the arm K, notched rake-teeth, and sash I, substantially as herein shown and described, for the purpose specified.

The above specification of my invention signed by me this 25th day of October, 1866.

SYLVESTER JOHNSON.

Witnesses:
WILLIAM STALLINGS,
JAMES H. JOHNSON.